(12) United States Patent
Kermiche et al.

(10) Patent No.: US 8,891,193 B1
(45) Date of Patent: Nov. 18, 2014

(54) DISK DRIVE CALIBRATING THRESHOLD AND GAIN OF TOUCHDOWN SENSOR

(71) Applicant: Western Digital Technologies, Inc., Irvine, CA (US)

(72) Inventors: Noureddine Kermiche, Dana Point, CA (US); Xianghui Xiao, Irvine, CA (US); Scott A. St. John, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/890,937

(22) Filed: May 9, 2013

(51) Int. Cl.
*G11B 21/02* (2006.01)
*G11B 5/02* (2006.01)
*G11B 27/36* (2006.01)
*G11B 19/04* (2006.01)
*G11B 5/60* (2006.01)

(52) U.S. Cl.
CPC .................................... *G11B 5/6029* (2013.01)
USPC ................... 360/75; 360/31; 360/60; 360/25; 73/105

(58) Field of Classification Search
None
See application file for complete search history.

(56) References Cited

U.S. PATENT DOCUMENTS

| | | | |
|---|---|---|---|
| 5,952,563 A * | 9/1999 | Shiraki | ............................ 73/105 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,097,559 A | 8/2000 | Ottesen et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |

(Continued)

OTHER PUBLICATIONS

Noureddine Kermiche, et al., U.S. Appl. No. 13/158,208, filed Aug. 30, 2010, 18 pages.

(Continued)

*Primary Examiner* — Andrew L Sniezek

(57) ABSTRACT

A disk drive is disclosed comprising a head actuated over a disk comprising a plurality of tracks. The head comprises a touchdown element operable to generate a touchdown signal. The touchdown signal is amplified by a gain to generate an amplified touchdown signal, and a touchdown event is detected by comparing the amplified touchdown signal to a threshold. During a calibration operation, the gain is adjusted and the threshold is adjusted until the amplified touchdown signal does not exceed the threshold. During a normal operation, the touchdown event is detected based at least partly on the adjusted gain and the adjusted threshold.

20 Claims, 4 Drawing Sheets

(56) References Cited

U.S. PATENT DOCUMENTS

| | | |
|---|---|---|
| 6,278,568 B1 | 8/2001 | Cloke et al. |
| 6,279,089 B1 | 8/2001 | Schibilla et al. |
| 6,288,856 B1 | 9/2001 | Ottesen et al. |
| 6,289,484 B1 | 9/2001 | Rothberg et al. |
| 6,292,912 B1 | 9/2001 | Cloke et al. |
| 6,293,135 B1 | 9/2001 | Marchon et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,417,981 B1 | 7/2002 | Smith |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,674,590 B2 | 1/2004 | Ottesen et al. |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,700,724 B2 | 3/2004 | Riddering et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,717,764 B2 | 4/2004 | Lake |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,785,081 B2 | 8/2004 | Chapin et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |

(56) References Cited

U.S. PATENT DOCUMENTS

| | | |
|---|---|---|
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,180,692 B1 | 2/2007 | Che et al. |
| 7,194,576 B1 | 3/2007 | Boyle |
| 7,199,961 B1 | 4/2007 | Wu et al. |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,401 B2 | 11/2007 | Shen et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,349,170 B1 * | 3/2008 | Rudman et al. .................. 360/75 |
| 7,359,139 B1 | 4/2008 | Wu et al. |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,394,611 B1 | 7/2008 | Rahgozar |
| 7,404,013 B1 | 7/2008 | Masiewicz |
| 7,405,896 B2 | 7/2008 | Hirano et al. |
| 7,406,545 B1 | 7/2008 | Rothberg et al. |
| 7,415,571 B1 | 8/2008 | Hanan |
| 7,423,830 B2 | 9/2008 | Ma et al. |
| 7,436,610 B1 | 10/2008 | Thelin |
| 7,437,502 B1 | 10/2008 | Coker |
| 7,440,214 B1 | 10/2008 | Ell et al. |
| 7,440,220 B1 | 10/2008 | Kang et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,483,227 B1 * | 1/2009 | Chen et al. .................. 360/25 |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,583,466 B2 | 9/2009 | Kermiche et al. |
| 7,596,797 B1 | 9/2009 | Kapner, III et al. |
| 7,599,139 B1 | 10/2009 | Bombet et al. |
| 7,616,398 B2 | 11/2009 | Gong et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,600 B2 | 2/2010 | Dakroub et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,679,857 B2 | 3/2010 | Zhu et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,796,356 B1 | 9/2010 | Fowler et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,040,630 B2 | 10/2011 | Kim et al. |
| 8,059,357 B1 | 11/2011 | Knigge et al. |
| 8,078,943 B1 | 12/2011 | Lee |
| 8,079,045 B2 | 12/2011 | Krapf et al. |
| 8,082,433 B1 | 12/2011 | Fallone et al. |

(56) References Cited

U.S. PATENT DOCUMENTS

| | | | |
|---|---|---|---|
| 8,085,487 B1 | 12/2011 | Jung et al. | |
| 8,085,490 B2 | 12/2011 | Franca-Neto et al. | |
| 8,089,719 B1 * | 1/2012 | Dakroub | 360/75 |
| 8,090,902 B1 | 1/2012 | Bennett et al. | |
| 8,090,906 B1 | 1/2012 | Blaha et al. | |
| 8,091,112 B1 | 1/2012 | Elliott et al. | |
| 8,094,396 B1 | 1/2012 | Zhang et al. | |
| 8,094,401 B1 | 1/2012 | Peng et al. | |
| 8,098,450 B2 | 1/2012 | Baumgart et al. | |
| 8,116,020 B1 | 2/2012 | Lee | |
| 8,116,025 B1 | 2/2012 | Chan et al. | |
| 8,134,793 B1 | 3/2012 | Vasquez et al. | |
| 8,134,798 B1 | 3/2012 | Thelin et al. | |
| 8,139,301 B1 | 3/2012 | Li et al. | |
| 8,139,310 B1 | 3/2012 | Hogg | |
| 8,144,419 B1 | 3/2012 | Liu | |
| 8,145,452 B1 | 3/2012 | Masiewicz et al. | |
| 8,149,528 B1 | 4/2012 | Suratman et al. | |
| 8,154,812 B1 | 4/2012 | Boyle et al. | |
| 8,159,768 B1 | 4/2012 | Miyamura | |
| 8,161,328 B1 | 4/2012 | Wilshire | |
| 8,164,849 B1 | 4/2012 | Szeremeta et al. | |
| 8,174,780 B1 | 5/2012 | Tsai et al. | |
| 8,190,575 B1 | 5/2012 | Ong et al. | |
| 8,194,338 B1 | 6/2012 | Zhang | |
| 8,194,340 B1 | 6/2012 | Boyle et al. | |
| 8,194,341 B1 | 6/2012 | Boyle | |
| 8,201,066 B1 | 6/2012 | Wang | |
| 8,271,692 B1 | 9/2012 | Dinh et al. | |
| 8,279,550 B1 | 10/2012 | Hogg | |
| 8,281,218 B1 | 10/2012 | Ybarra et al. | |
| 8,285,923 B2 | 10/2012 | Stevens | |
| 8,289,656 B1 | 10/2012 | Huber | |
| 8,305,705 B1 | 11/2012 | Roohr | |
| 8,307,156 B1 | 11/2012 | Codilian et al. | |
| 8,310,775 B1 | 11/2012 | Boguslawski et al. | |
| 8,315,006 B1 | 11/2012 | Chahwan et al. | |
| 8,316,263 B1 | 11/2012 | Gough et al. | |
| 8,320,067 B1 | 11/2012 | Tsai et al. | |
| 8,324,974 B1 | 12/2012 | Bennett | |
| 8,331,049 B2 | 12/2012 | Lee et al. | |
| 8,332,695 B2 | 12/2012 | Dalphy et al. | |
| 8,339,919 B1 | 12/2012 | Lee | |
| 8,341,337 B1 | 12/2012 | Ong et al. | |
| 8,350,628 B1 | 1/2013 | Bennett | |
| 8,356,184 B1 | 1/2013 | Meyer et al. | |
| 8,370,683 B1 | 2/2013 | Ryan et al. | |
| 8,375,225 B1 | 2/2013 | Ybarra | |
| 8,375,274 B1 | 2/2013 | Bonke | |
| 8,380,922 B1 | 2/2013 | DeForest et al. | |
| 8,390,948 B2 | 3/2013 | Hogg | |
| 8,390,952 B1 | 3/2013 | Szeremeta | |
| 8,392,689 B1 | 3/2013 | Lott | |
| 8,407,393 B1 | 3/2013 | Yolar et al. | |
| 8,413,010 B1 | 4/2013 | Vasquez et al. | |
| 8,417,566 B2 | 4/2013 | Price et al. | |
| 8,421,663 B1 | 4/2013 | Bennett | |
| 8,422,172 B1 | 4/2013 | Dakroub et al. | |
| 8,427,770 B1 | 4/2013 | O'Dell et al. | |
| 8,427,771 B1 | 4/2013 | Tsai | |
| 8,429,343 B1 | 4/2013 | Tsai | |
| 8,433,937 B1 | 4/2013 | Wheelock et al. | |
| 8,433,977 B1 | 4/2013 | Vasquez et al. | |
| 8,441,909 B1 | 5/2013 | Thayamballi et al. | |
| 8,456,980 B1 | 6/2013 | Thayamballi | |
| 8,458,526 B2 | 6/2013 | Dalphy et al. | |
| 8,462,466 B2 | 6/2013 | Huber | |
| 8,467,151 B1 | 6/2013 | Huber | |
| 8,483,027 B1 | 7/2013 | Mak et al. | |
| 8,489,841 B1 | 7/2013 | Strecke et al. | |
| 8,493,679 B1 | 7/2013 | Boguslawski et al. | |
| 8,499,198 B1 | 7/2013 | Messenger et al. | |
| 8,514,506 B1 | 8/2013 | Li et al. | |
| 8,554,741 B1 | 10/2013 | Malina | |
| 8,560,759 B1 | 10/2013 | Boyle et al. | |
| 8,576,509 B1 | 11/2013 | Hogg | |
| 8,576,511 B1 | 11/2013 | Coker et al. | |
| 8,578,100 B1 | 11/2013 | Huynh et al. | |
| 8,578,242 B1 | 11/2013 | Burton et al. | |
| 8,582,223 B1 | 11/2013 | Garani et al. | |
| 8,582,231 B1 | 11/2013 | Kermiche et al. | |
| 8,589,773 B1 | 11/2013 | Wang et al. | |
| 8,593,753 B1 | 11/2013 | Anderson | |
| 8,599,512 B2 | 12/2013 | Hogg | |
| 8,605,379 B1 | 12/2013 | Sun | |
| 8,611,031 B1 | 12/2013 | Tan et al. | |
| 8,611,032 B2 | 12/2013 | Champion et al. | |
| 8,612,798 B1 | 12/2013 | Tsai | |
| 8,619,383 B1 | 12/2013 | Jung et al. | |
| 8,619,508 B1 | 12/2013 | Krichevsky et al. | |
| 8,619,529 B1 | 12/2013 | Liew et al. | |
| 8,621,115 B1 | 12/2013 | Bombet et al. | |
| 8,621,133 B1 | 12/2013 | Boyle | |
| 8,625,224 B1 | 1/2014 | Lin et al. | |
| 8,625,225 B1 | 1/2014 | Wang | |
| 8,626,463 B2 | 1/2014 | Stevens et al. | |
| 8,630,052 B1 | 1/2014 | Jung et al. | |
| 8,631,188 B1 | 1/2014 | Heath et al. | |
| 8,635,412 B1 | 1/2014 | Wilshire | |
| 8,661,193 B1 | 2/2014 | Cobos et al. | |
| 8,665,546 B1 * | 3/2014 | Zhao et al. | 360/55 |
| 8,665,547 B1 | 3/2014 | Yeo et al. | |
| 8,667,248 B1 | 3/2014 | Neppalli | |
| 8,670,205 B1 | 3/2014 | Malina et al. | |
| 8,671,250 B2 | 3/2014 | Lee | |
| 8,681,442 B2 | 3/2014 | Hogg | |
| 8,681,445 B1 | 3/2014 | Kermiche et al. | |
| 8,683,295 B1 | 3/2014 | Syu et al. | |
| 8,687,306 B1 | 4/2014 | Coker et al. | |
| 8,687,307 B1 | 4/2014 | Patton, III | |
| 8,687,313 B2 | 4/2014 | Selvaraj | |
| 8,693,133 B1 | 4/2014 | Lee et al. | |
| 8,698,492 B1 | 4/2014 | Mak et al. | |
| 8,699,171 B1 | 4/2014 | Boyle | |
| 8,699,172 B1 | 4/2014 | Gunderson et al. | |
| 8,711,500 B1 | 4/2014 | Fong et al. | |
| 8,711,506 B1 | 4/2014 | Giovenzana et al. | |
| 8,711,665 B1 | 4/2014 | Abdul Hamid | |
| 8,717,694 B1 | 5/2014 | Liew et al. | |
| 8,717,695 B1 | 5/2014 | Lin et al. | |
| 8,730,612 B1 | 5/2014 | Haralson | |
| 8,743,502 B1 | 6/2014 | Bonke et al. | |
| 8,749,911 B1 | 6/2014 | Sun et al. | |
| 2002/0054446 A1 | 5/2002 | Smith | |
| 2006/0132961 A1 | 6/2006 | Ma | |
| 2007/0291401 A1 | 12/2007 | Sun et al. | |
| 2008/0278835 A1 | 11/2008 | Dakroub et al. | |
| 2009/0113702 A1 | 5/2009 | Hogg | |
| 2009/0128947 A1 | 5/2009 | Kermiche et al. | |
| 2010/0306551 A1 | 12/2010 | Meyer et al. | |
| 2011/0157736 A1 | 6/2011 | Contreras et al. | |
| 2011/0157740 A1 | 6/2011 | Baumgart et al. | |
| 2011/0226729 A1 | 9/2011 | Hogg | |
| 2012/0159042 A1 | 6/2012 | Lott et al. | |
| 2012/0212851 A1 | 8/2012 | Goldberg et al. | |
| 2012/0275050 A1 | 11/2012 | Wilson et al. | |
| 2012/0281963 A1 | 11/2012 | Krapf et al. | |
| 2012/0324980 A1 | 12/2012 | Nguyen et al. | |

OTHER PUBLICATIONS

Dean V. Dang, et al., U.S. Appl. No. 13/678,495, filed Nov. 15, 2012, 16 pages.

Carl E. Barlow, et al., U.S. Appl. No. 13/652,239, filed Oct. 15, 2012, 14 pages.

Zhong Shi, et al., U.S. Appl. No. 13/621,728, filed Sep. 17, 2012, 17 pages.

Abhimanyu Sharma, et al., U.S. Appl. No. 13/100,897, filed May 4, 2011, 16 pages.

* cited by examiner

DISK DRIVE CALIBRATING THRESHOLD AND GAIN OF TOUCHDOWN SENSOR

BACKGROUND

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

Each data sector is typically assigned a physical block address (PBA) which is accessed indirectly through a logical block address (LBA) to facilitate mapping out defective data sectors. A PBA associated with defective data sectors may simply remain unmapped if found during manufacturing, or if a data sector becomes defective while in-the-field (grown defect), the LBA may be remapped to the PBA of a spare data sector (and the data relocated to the spare data sector). The process of initially mapping the LBAs to PBAs and mapping out defective PBAs is referred to as "formatting" the disk. The head may be fabricated with a suitable touchdown sensor, such as a suitable magnetoresistive sensor, which may be used to detect defects on the disk, such as thermal asperities. It may be desirable to calibrate the sensitivity of the touchdown sensor in order to maximize the detection of truly defective data sectors as well as minimize the number of false detections that leads to unnecessary remapping of good data sectors.

While the disk drive is deployed in the field, the touchdown sensor may also be used to abort write operations. Since a touchdown event may degrade the quality of written data, and may also cause an off-track corruption of previously written data, a write operation may be aborted and retried when a touchdown event is detected. It may be desirable to calibrate the sensitivity of the touchdown sensor so that true touchdown events are detected, and so that false touchdown events are minimized, thereby maintaining the integrity of written data as well as an acceptable performance level by avoiding unnecessary retry operations.

DETAILED DESCRIPTION

Figure 1A:
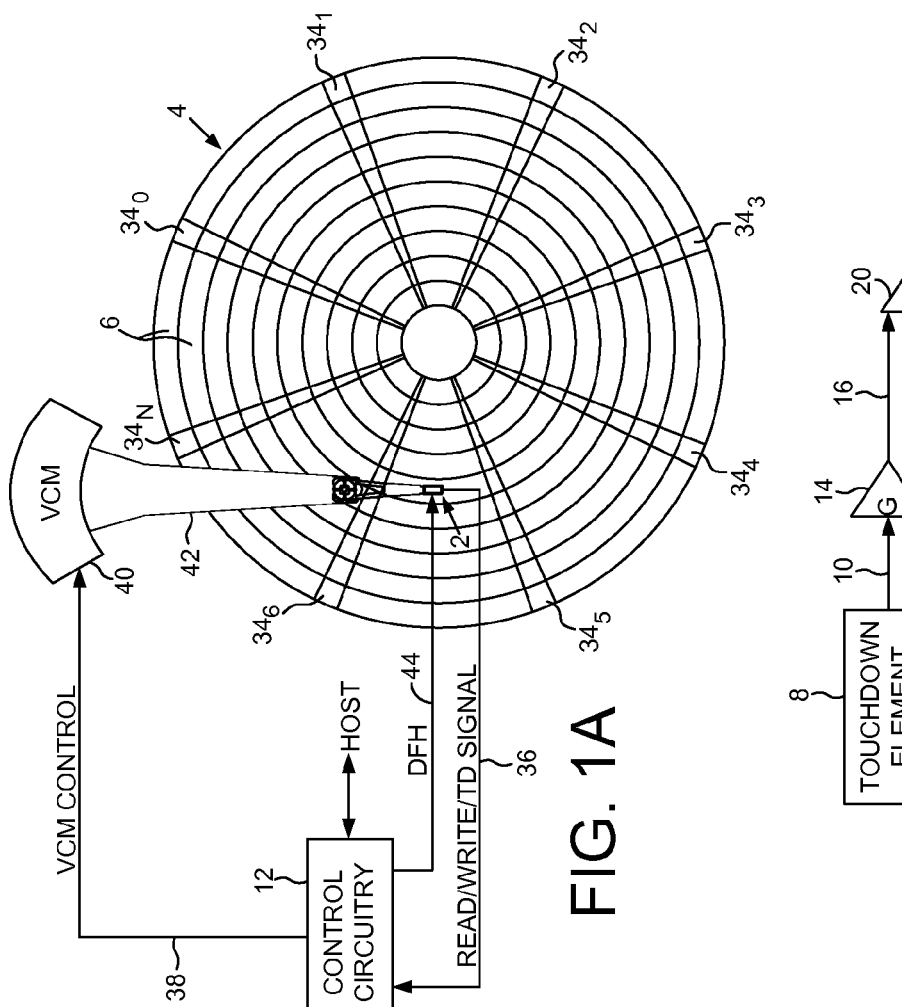
FIG. 1A shows a disk drive according to an embodiment comprising a head actuated over a disk, wherein the head comprises a touchdown element.
Figure 1B:
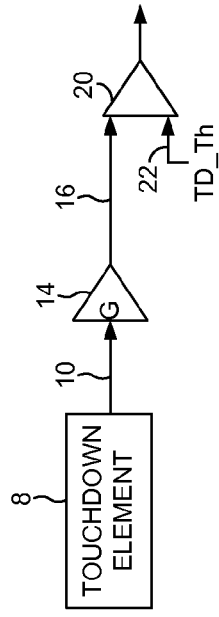
FIG. 1B shows a touchdown sensor according to an embodiment wherein a touchdown event is detected by comparing an amplified touchdown signal to a threshold.
Figure 1C:
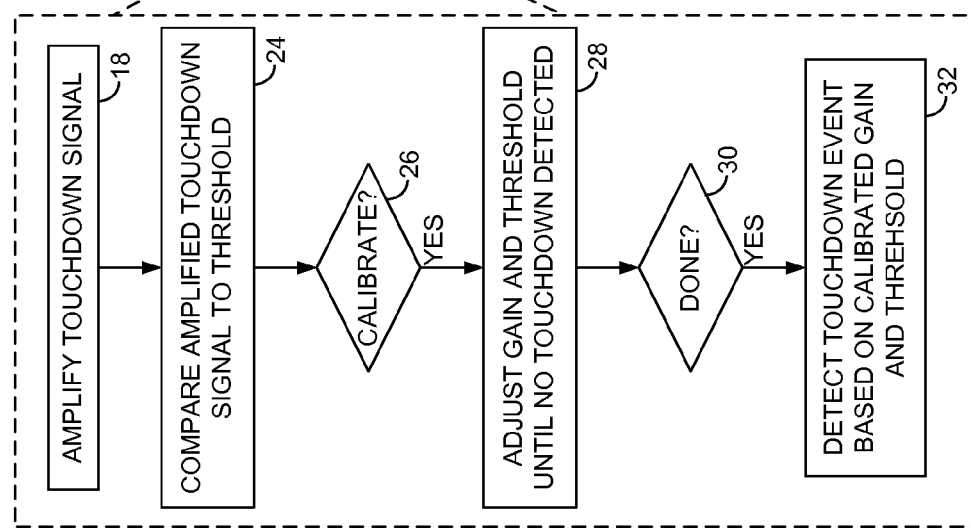
FIG. 1C is a flow diagram according to an embodiment wherein during a calibration operation, the amplified gain is adjusted and the threshold is adjusted until the amplified touchdown signal does not exceed the threshold.

FIG. 1A shows a disk drive according to an embodiment comprising a head 2 actuated over a disk 4 comprising a plurality of tracks 6. The head 2 comprises a touchdown element 8 (FIG. 1B) operable to generate a touchdown signal 10. The disk drive further comprises control circuitry 12 operable to execute the flow diagram of FIG. 1C, wherein the touchdown signal 10 is amplified by a gain 14 to generate an amplified touchdown signal 16 (block 18), and a touchdown event is detected by comparing 20 the amplified touchdown signal 16 to a threshold 22 (block 24). During a calibration operation (block 26), the gain 14 is adjusted and the threshold 22 is adjusted (block 28) until the amplified touchdown signal 16 does not exceed the threshold 22 (block 30). During a normal operation, the touchdown event is detected based at least partly on the adjusted gain 14 and the adjusted threshold 22 (block 32).

In the embodiment of FIG. 1A, the tracks 6 on the disk 4 are defined by servo sectors $34_0$-$34_N$. The control circuitry 12 processes a read signal 36 emanating from the head 2 to demodulate the servo sectors $34_0$-$34_N$ and generate a position error signal (PES) representing an error between the actual position of the head and a target position relative to a target track. The control circuitry 12 filters the PES using a suitable compensation filter to generate a control signal 38 applied to a voice coil motor (VCM) 40 which rotates an actuator arm 42 about a pivot in order to actuate the head 2 radially over the disk 4 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the touchdown sensor (e.g., the touchdown element 8, gain 14, and comparator 20) may be used to detect defects on the disk 4, such as thermal asperities. It may therefore be desirable to calibrate the sensitivity of the touchdown sensor in order to maximize the detection of truly defective data sectors as well as minimize the number of false detections that leads to unnecessary remapping of good data sectors. In another embodiment the touchdown sensor may be used to abort write operations to avoid corrupting the data recorded in adjacent tracks. Therefore, it may also be desirable to calibrate the sensitivity of the touchdown sensor so that true touchdown events are detected, and so that false touchdown events are minimized, thereby maintaining the integrity of written data as well as an acceptable performance level by avoiding unnecessary retry operations.

Any suitable touchdown element 8 may be employed, such as a magnetoresistive (MR) element. In one embodiment, the touchdown sensor is calibrated in order to find the noise floor of the touchdown sensor. The touchdown sensor may then be margined relative to the noise floor in order to optimize the sensitivity. In one embodiment, the noise floor of the touchdown sensor is found by adjusting the gain 14 and adjusting the threshold 22 in FIG. 1B until the amplified touchdown signal 16 does not exceed the threshold 22 at comparator 20.

In the embodiment where the touchdown sensor is used to abort write operations, the fly height of the head 2 over the disk 4 may be controlled to a normal writing fly height while calibrating the touchdown sensor. In one embodiment, the head 2 comprises a suitable fly height actuator, such as a heater that actuates through thermal expansion, or a piezo-electric actuator that actuates through mechanical deflection. In the embodiment of FIG. 1A, the control circuitry 12 may generate a dynamic fly height (DFH) control signal 44 applied to the fly height actuator which may comprise a DC component as well as an AC component in order to follow the topography of the disk 4.

Figure 2:
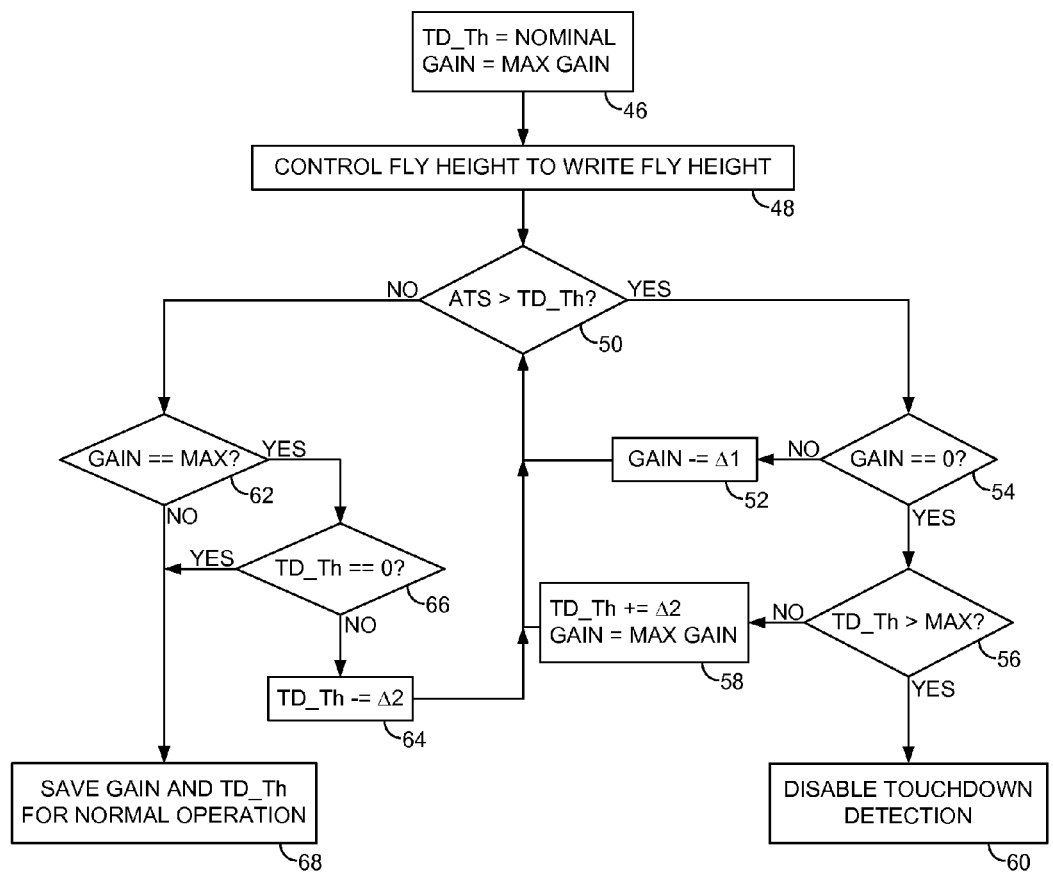
FIG. 2 is a flow diagram according to an embodiment wherein the threshold is initialized to a nominal value and the gain is initialized to a maximum gain, and when the amplified touchdown signal exceeds the threshold, the gain is decreased, and when the gain reaches approximately zero, the threshold is increased.

FIG. 2 is a flow diagram according to an embodiment for calibrating the touchdown sensor. The threshold 22 is initialized to a nominal value, and the gain 14 is initialized to a maximum value (block 46). The fly height of the head 2 over the disk 4 is controlled to a normal writing fly height (block 48) which typically means the fly height is reduced from an idle fly height. If the amplified touchdown signal (ATS) 16 exceeds the threshold 22 (block 50), it is assumed that the gain 14 is too high (i.e., a touchdown event is being caused by noise). The gain is therefore decreased at block 52 until the ATS no longer exceeds the threshold at block 50, or until the gain reaches zero at block 54. If the gain reaches zero at block 54, and the threshold is less than a maximum at block 56, then the threshold is increased and the gain is reset to the maximum at block 58, and the flow diagram is repeated. If the threshold reaches the maximum at block 56 (and the gain reaches zero at block 54), it is assumed the touchdown sensor is unreliable (too high of a noise floor), and therefore the touchdown sensor is disabled during normal operation for at least part of the disk (block 60).

If the ATS does not exceed the threshold at block 50 and the gain equals the maximum at block 62, then the threshold is decreased at block 64 until the threshold reaches zero at block 66. If the gain does not equal the maximum at block 62, it means the adjusted gain and the adjusted threshold correspond to the noise floor of the touchdown sensor. Alternatively, if the gain equals the maximum at block 62 and the threshold reaches zero at block 66, it means the touchdown sensor has a noise floor of approximately zero. In either case, the adjusted gain and the adjusted threshold settings are saved and used to detect the touchdown events during normal operation (block 68).

Figure 3A:
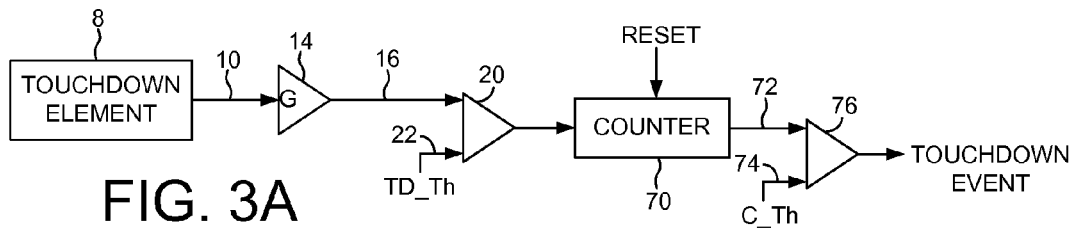
FIG. 3A shows a touchdown sensor according to an embodiment wherein the output of the comparator increments a counter, and the output of the counter is compared to a counter threshold.

FIG. 3A shows a touchdown sensor for detecting a touchdown event according to an embodiment wherein a counter 70 counts a number of times the amplified touchdown signal 16 exceeds the threshold 22 over a predetermined window of time. At the beginning of the window, the counter 70 is reset, and if the output 72 of the counter 70 exceeds a counter threshold 74 at comparator 76, the touchdown event is detected.

Figure 3B:
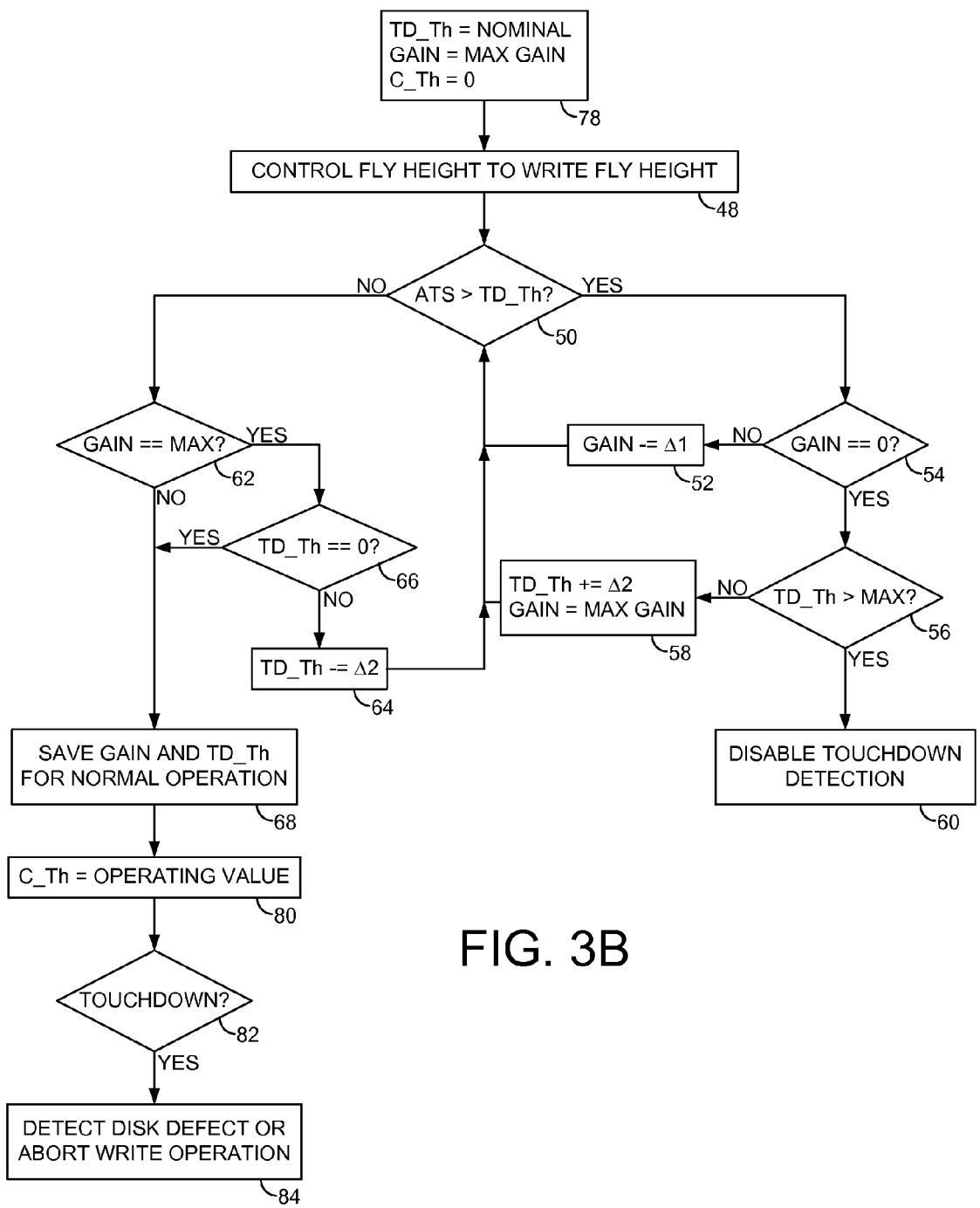
FIG. 3B is a flow diagram according to an embodiment wherein a margin is added to the counter threshold in order to margin the touchdown detection.

FIG. 3B is a flow diagram according to an embodiment which extends on the flow diagram of FIG. 2, wherein when calibrating the touchdown sensor of FIG. 3A, the counter threshold 74 is initialized to zero (block 78) so that the touchdown event is detected when the counter 70 increments a single time. After calibrating the gain 14 and threshold 22 which are saved at block 68, the counter threshold is set to a target, non-zero operating value, thereby margining the detection of the touchdown event. For example, if the counter threshold is set to two at block 80, then the touchdown event may be detected when the amplified touchdown signal 16 exceeds the threshold 22 three times at block 82. When a touchdown event is detected, the control circuitry 12 may respond in any manner, such as by detecting a disk defect or aborting a write operation (block 84).

Figure 4:
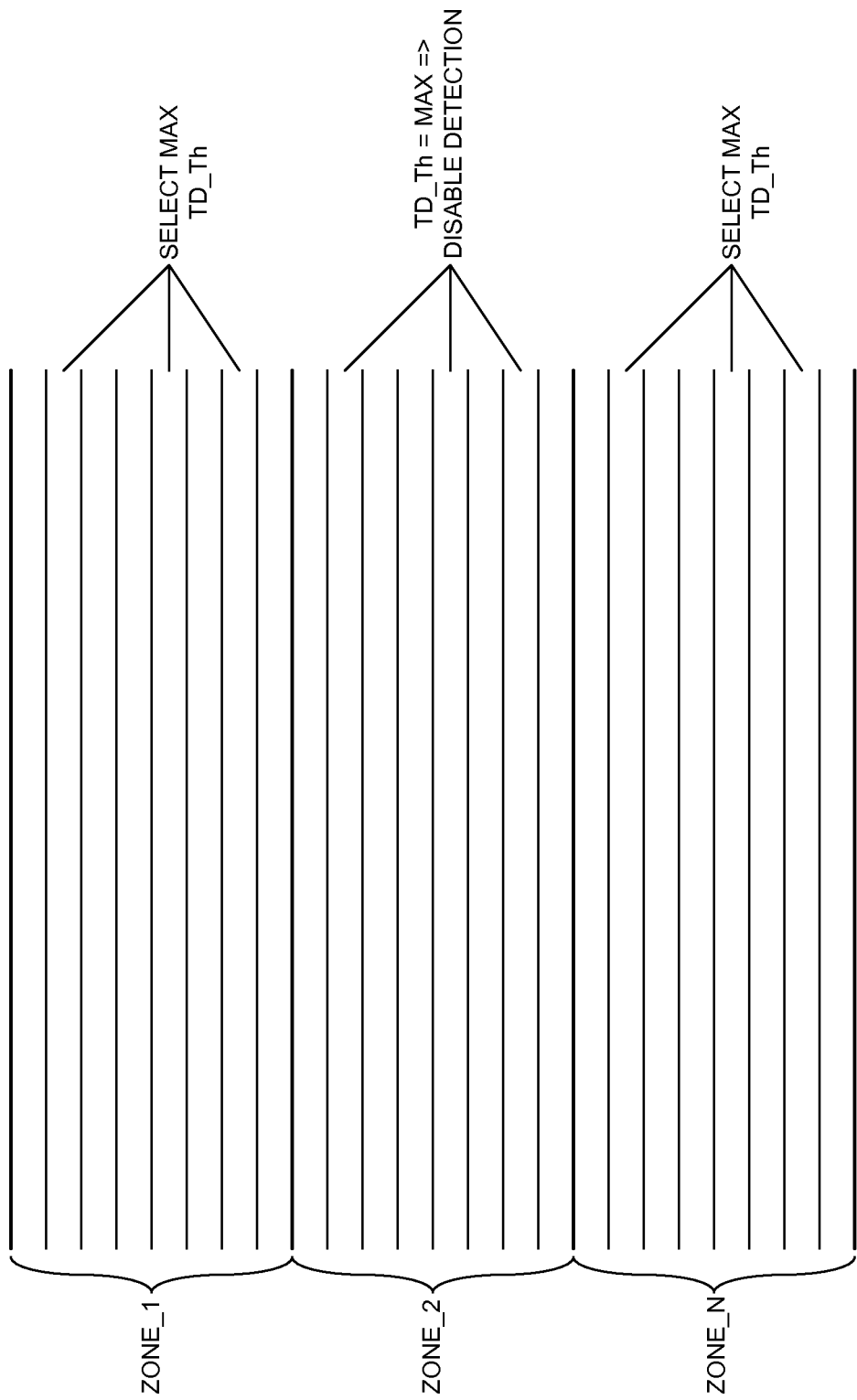
FIG. 4 illustrates an embodiment wherein a number of zones are defined on the disk, wherein each zone comprises a plurality of the tracks, and the calibration operation is executed for at least one track of each zone.

FIG. 4 shows an embodiment wherein the control circuitry 12 is further operable to define a number of zones on the disk (ZONE_1 to ZONE_N), wherein each zone comprises a plurality of the tracks. The calibration operation for calibrating the touchdown sensor is executed for at least one track of each zone so that a gain and threshold may be selected for each zone. During normal operation, the touchdown events are detected for each zone based on the corresponding gain and threshold calibrated for the zone. In one embodiment, the touchdown sensor may be disabled for any particular zone if the calibration fails at block 60 of FIG. 2.

In one embodiment, the calibration operation is executed for a plurality of tracks of each zone (e.g., ZONE_1), wherein in one embodiment the plurality of tracks are separated radially so as to provide a representative sampling across each zone. In one embodiment, the gain 14 and threshold 22 corresponding to the highest threshold calibrated out of the plurality of tracks are selected for use during the normal operation of the disk drive. If the threshold reaches the maximum at block 56 of FIG. 2 for any of the tracks being evaluated, then the touchdown sensor may be disabled for the corresponding zone (e.g., ZONE_2).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk comprising a plurality of tracks;
   a head actuated over the disk, the head comprising a touchdown element operable to generate a touchdown signal; and
   control circuitry operable to:
      amplify the touchdown signal by a gain to generate an amplified touchdown signal;
      detect a touchdown event by comparing the amplified touchdown signal to a threshold;
      during a calibration operation, adjust the gain and adjust the threshold until the amplified touchdown signal does not exceed the threshold; and
      during a normal operation, detect the touchdown event based at least partly on the adjusted gain and the adjusted threshold.

2. The disk drive as recited in claim 1, wherein:
   the head further comprises a fly height actuator operable to control a fly height of the head over the disk; and
   during the calibration operation, the control circuitry is operable to apply a control signal to the fly height actuator to cause the head to fly at a target fly height corresponding to a write operation.

3. The disk drive as recited in claim 1, wherein during the calibration operation the control circuitry is further operable to:
   initialize the threshold to a nominal value;
   initialize the gain to a maximum gain;
   when the amplified touchdown signal exceeds the threshold, decrease the gain; and
   when the gain reaches approximately zero, increase the threshold.

4. The disk drive as recited in claim 3, wherein when the amplified touchdown signal does not exceed the threshold and the gain equals the maximum gain, the control circuitry is further operable to decrease the threshold.

5. The disk drive as recited in claim 3, wherein when the threshold is increased to a maximum threshold and the amplified touchdown signal exceeds the threshold when the gain is approximately zero, the control circuitry is operable to disable the touchdown detection during the normal operation for at least part of the disk.

6. The disk drive as recited in claim 1, wherein the control circuitry is further operable to:
   define a number of zones on the disk, wherein each zone comprises a plurality of the tracks; and
   execute the calibration operation for at least one track of each zone.

7. The disk drive as recited in claim 6, wherein the control circuitry is further operable to:
   execute the calibration operation for a plurality of tracks of a first zone; and
   select the gain and threshold corresponding to the highest threshold calibrated out of the plurality tracks for use during the normal operation.

8. The disk drive as recited in claim 1, wherein control circuitry is further operable to margin the detection of the touchdown event.

9. The disk drive as recited in claim 1, wherein during the normal operation the control circuitry is further operable to detect a defect on the disk based at least partly on the detected touchdown event.

10. The disk drive as recited in claim 1, wherein during the normal operation the control circuitry is further operable to abort a write operation based at least partly on the detected touchdown event.

11. A method of operating a disk drive comprising a head actuated over a disk comprising a plurality of tracks, the head comprising a touchdown element operable to generate a touchdown signal, the method comprising:
    amplifying the touchdown signal by a gain to generate an amplified touchdown signal;
    detecting a touchdown event by comparing the amplified touchdown signal to a threshold;
    during a calibration operation, adjusting the gain and adjusting the threshold until the amplified touchdown signal does not exceed the threshold; and
    during a normal operation, detecting the touchdown event based at least partly on the adjusted gain and the adjusted threshold.

12. The method as recited in claim 11, wherein:
    the head further comprises a fly height actuator operable to control a fly height of the head over the disk; and
    during the calibration operation, the method further comprises applying a control signal to the fly height actuator to cause the head to fly at a target fly height corresponding to a write operation.

13. The method as recited in claim 11, wherein during the calibration operation further comprising:
    initializing the threshold to a nominal value;
    initializing the gain to a maximum gain;
    when the amplified touchdown signal exceeds the threshold, decreasing the gain; and
    when the gain reaches approximately zero, increasing the threshold.

14. The method as recited in claim 13, wherein when the amplified touchdown signal does not exceed the threshold and the gain equals the maximum gain, the method further comprises decreasing the threshold.

15. The method as recited in claim 13, wherein when the threshold is increased to a maximum threshold and the amplified touchdown signal exceeds the threshold when the gain is approximately zero, the method further comprises disabling the touchdown detection during the normal operation for at least part of the disk.

16. The method as recited in claim 11, further comprising:
    defining a number of zones on the disk, wherein each zone comprises a plurality of the tracks; and
    executing the calibration operation for at least one track of each zone.

17. The method as recited in claim 16, further comprising:
    executing the calibration operation for a plurality of tracks of a first zone; and
    selecting the gain and threshold corresponding to the highest threshold calibrated out of the plurality tracks for use during the normal operation.

18. The method as recited in claim 11, further comprising margining the detection of the touchdown event.

19. The method as recited in claim 11, wherein during the normal operation the method further comprises detecting a defect on the disk based at least partly on the detected touchdown event.

20. The method as recited in claim 11, wherein during the normal operation the method further comprises aborting a write operation based at least partly on the detected touchdown event.

* * * * *